United States Patent
Wexler

(10) Patent No.: US 8,176,878 B1
(45) Date of Patent: May 15, 2012

(54) METHOD AND APPARATUS FOR RESTRAINING AND MUZZLING ANIMALS

(75) Inventor: Toby J. Wexler, Lafayette, LA (US)

(73) Assignee: Toby J. Wexler, Lafayette, LA (US)

( * ) Notice: Subject to any disclaimer, the term of this patent is extended or adjusted under 35 U.S.C. 154(b) by 440 days.

(21) Appl. No.: 12/069,834

(22) Filed: Feb. 12, 2008

(51) Int. Cl.
*A01K 15/04* (2006.01)

(52) U.S. Cl. ........ 119/801; 119/761; 119/837; 119/851; 119/174; 119/799; 128/857; 128/858; 128/869; 54/80.1; 54/80.2

(58) Field of Classification Search .................. 119/761, 119/837, 851, 174, 799, 801–805, 831, 850; 128/857, 858, 869; 54/80.1, 80.2
See application file for complete search history.

(56) References Cited

U.S. PATENT DOCUMENTS

| | | | |
|---|---|---|---|
| 504,055 A | 8/1893 | Shaw | |
| 1,478,999 A * | 1/1924 | Johnson | 119/804 |
| 2,115,082 A * | 4/1938 | Phillips | 43/12 |
| 3,046,929 A * | 7/1962 | Piver | 114/218 |
| 3,319,609 A * | 5/1967 | Pickard et al. | 119/804 |
| 4,003,595 A * | 1/1977 | Fano et al. | 294/1.5 |
| 4,446,646 A * | 5/1984 | van't Veld | 43/12 |
| 4,912,816 A | 4/1990 | Brandt | |
| 5,020,478 A | 6/1991 | Salvatore | |
| 5,083,418 A * | 1/1992 | Reece | 56/239 |
| 5,088,449 A * | 2/1992 | Lamb et al. | 119/802 |
| 5,193,252 A | 3/1993 | Svehaug | |
| 5,341,627 A * | 8/1994 | Eby | 54/80.2 |
| 5,778,826 A * | 7/1998 | Dillon et al. | 119/717 |
| 5,803,017 A | 9/1998 | Stewart | |
| 6,098,572 A * | 8/2000 | Cook | 119/802 |
| 6,267,081 B1 | 7/2001 | Rich | |
| 6,598,335 B2 * | 7/2003 | Akhtar et al. | 43/12 |
| 2006/0191542 A1 * | 8/2006 | Dillon | 128/869 |

FOREIGN PATENT DOCUMENTS

EP 1 574 131 A1 9/2005

* cited by examiner

*Primary Examiner* — Joshua J Michener
*Assistant Examiner* — Justin Benedik
(74) *Attorney, Agent, or Firm* — Garvey, Smith, Nehrbass & North, L.L.C.; Gregory C. Smith

(57) ABSTRACT

A semi-rigid animal head enclosure with a handle effective in muzzling and controlling a fractious animal using a lead passing through a portion of the enclosure and secured thereto or in corporation with a special capture stick having a lead forming a loop secured to the enclosure, one end of the stick and loop passing through the head enclosure and encircling the neck of an animal the stick having a method for releasing the lead from the capture stick, removing the stick from enclosure allows the lead to be secured to the head enclosure thus maintaining the enclosure over the head of the animal.

1 Claim, 6 Drawing Sheets

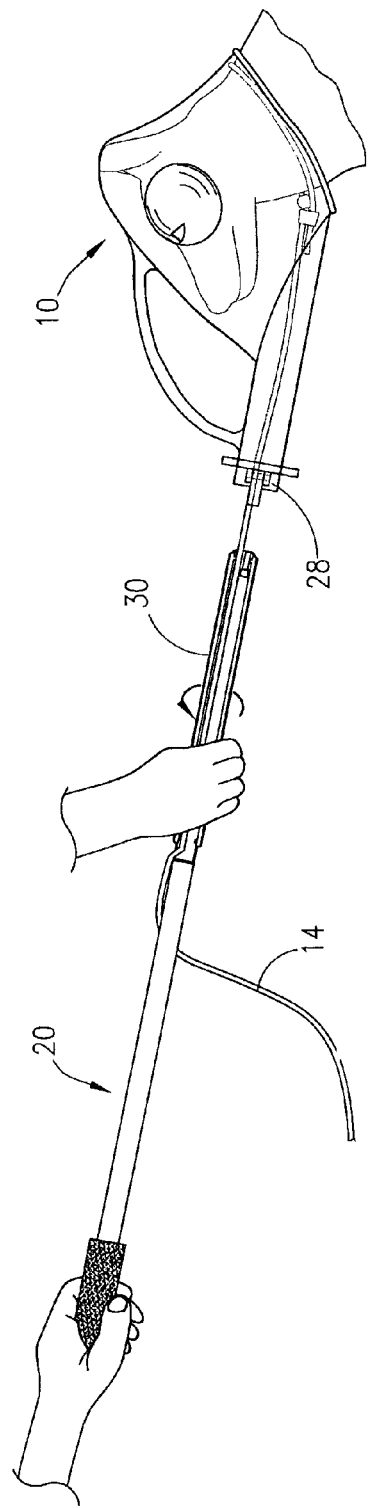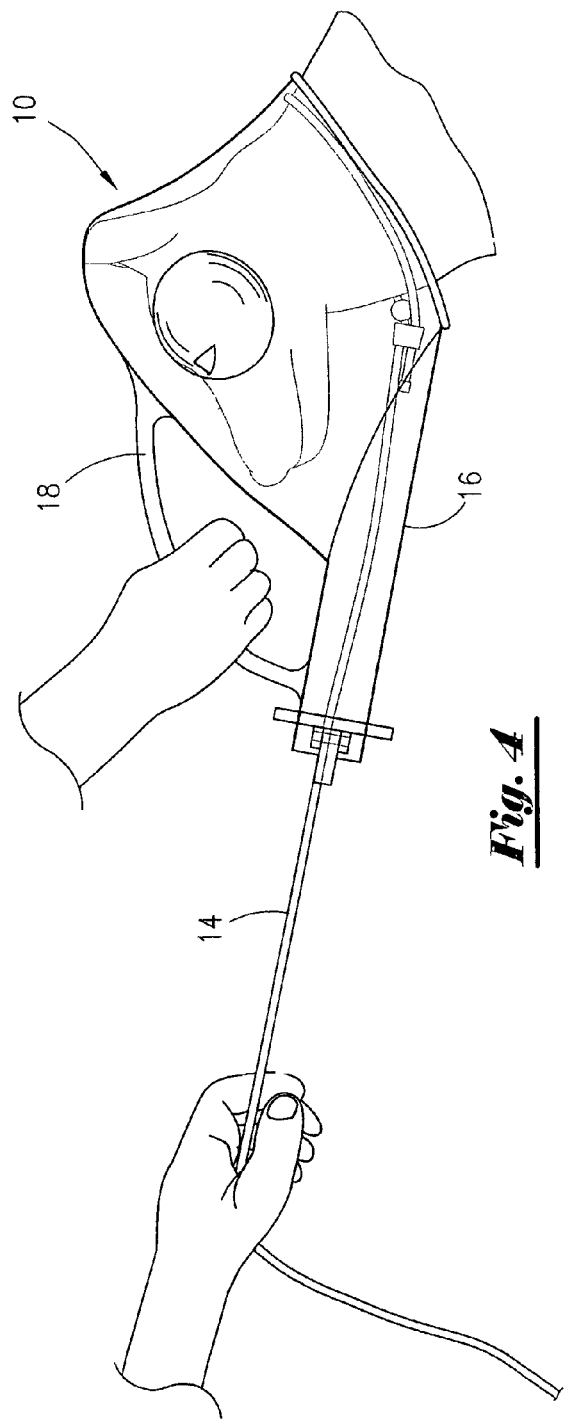

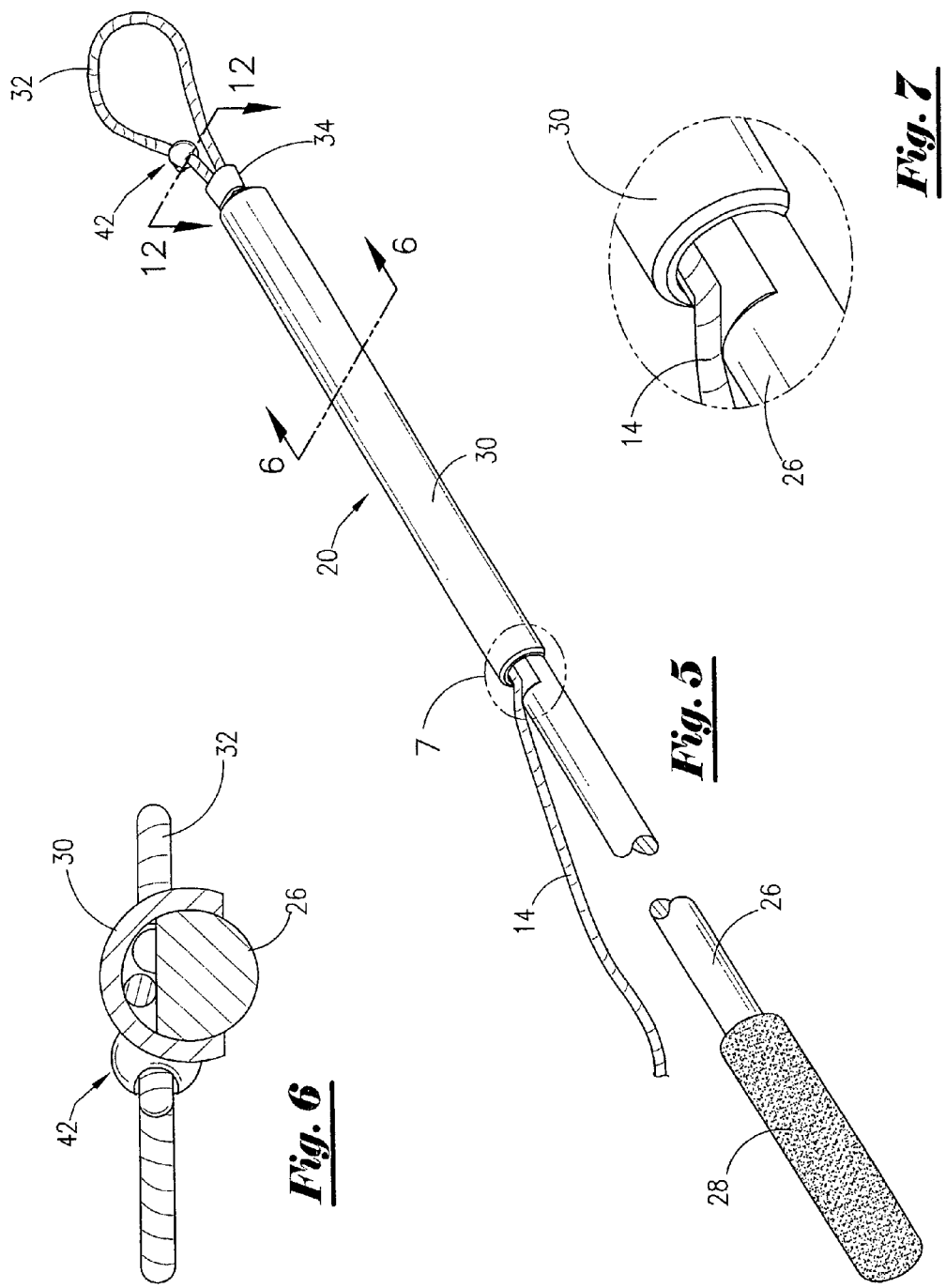

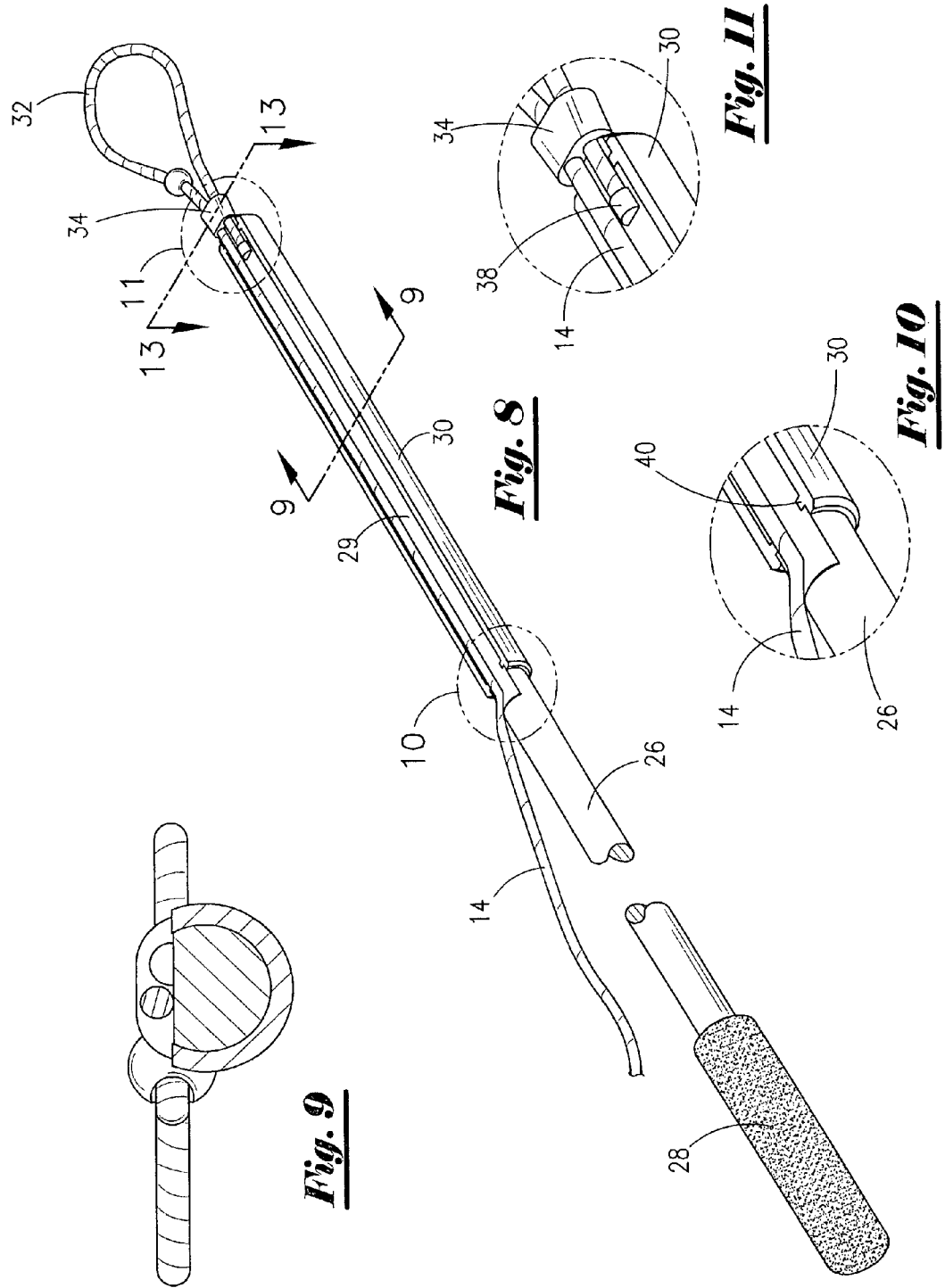

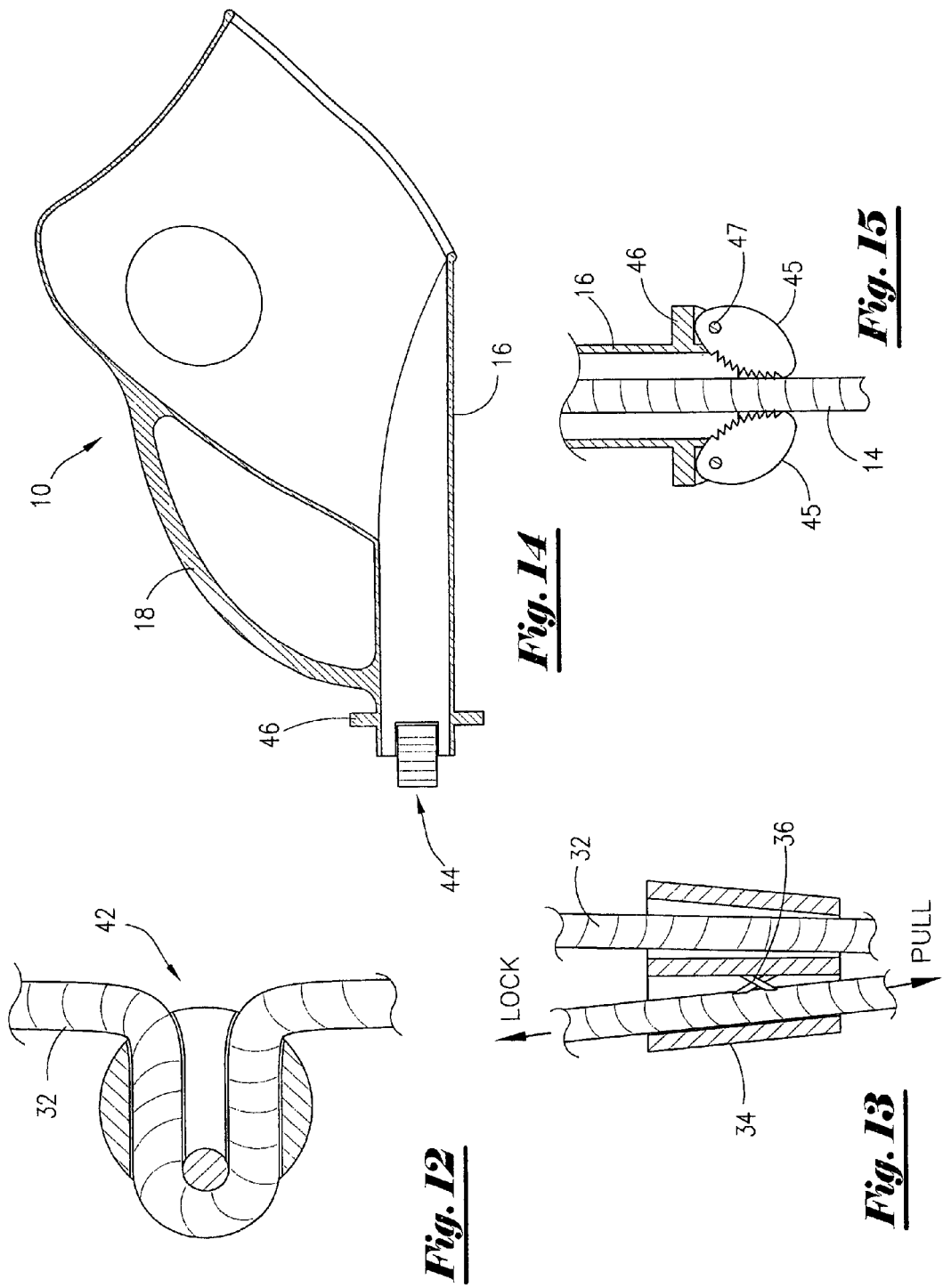

METHOD AND APPARATUS FOR RESTRAINING AND MUZZLING ANIMALS

1. FIELD OF THE INVENTION

This invention relates generally to capture sticks, animal restraint devices and muzzles and more particularly to a method and apparatus for encircling the head of an animal using a lanyard, lead or leash arrangement, to capture the animal without choking, and applying a semi-rigid head enclosure or hood over the animal's head, slidable along a lanyard, lead or leash and/or capture pole, thereby rendering the animal relatively harmless and more controllable.

2. GENERAL BACKGROUND

The apparatus disclosed herein is useful primarily for small animals considered as domesticated canines, and felines as well as similar sized or smaller wild animals. Such animals must receive treatment from time to time or simply be moved from place to place into unfamiliar surroundings by handlers unfamiliar to the animal. In many cases the animal is sick or hurt thus adding to their distress. Distressed animals defend themselves the only way they know, by tooth and claw. Unfortunately humans often interpret this behavior as aggression and use extreme measures to restrain the animal. Such measures often further antagonize the animal.

When an animal that must be treated is of a significant size and there is insufficient time to coax the animal into submission, or the animal is a danger to humans and other animals, some means must be employed to restrain the animal without injury to the animal or human personnel. In most cases either the owner or personnel charged with the responsibility for the animal gains some degree of control over the animal by applying a leash or chain to the animal's neck or collar. The animal can then be forced into a crate for transport.

Where this is not possible, in cases where the animal can not be approached readily, a capture pole having rope or cable lanyard having a retractable loop at one end is used to encircle the animal's head and cinched tightly, often choking the animal into submission. The animal is lifted using the pole into a cage where the capture pole is removed. Upon arrival at a treatment center the animal must then be removed from the cage or transferred again by force using the capture pole, all of which is a traumatic experience for both the animal and the personnel involved. Even when the animal is safely caged, treating or sedating the animal may also become a major problem. The possibility of serious injury to the animal or handling personnel is quite high during these events.

In view of the above problems and the processes currently used to control violent animals it becomes apparent that a more secure, less violent approach is needed. Therefore, it would be beneficial to transfer control of an animal having a lead around the animal's neck to another handler if the animal's head is muzzled so as to prevent any possibility of the handler being bitten. Further, once muzzled the animal may be sedated thus reducing stress while being handled. The problem of placing the muzzle over the animal's head without injury to the animal or handling personnel has defied handlers for years. The apparatus disclosed herein and its method of use provides a straightforward approach that solves the above problems in a simple manner with less stress for all.

3. SUMMARY OF THE INVENTION

The instant invention involves the use of a shaped, semi-rigid, semi-transparent hood/restraint for enclosing an animal's head. The hood is a nipple shaped tubular with an opening for the head in one end and reducing down to a tube shape to hold the lead or pole at the opposite end. The hood includes a handle for guiding the hood over the animal's head and an opening or aperture therein for passing a lead encircling the animal's neck thereby restraining the animal while applying the hood. The opening is also sufficient to pass a releasable capture stick used to place a lead around the animal's neck with anti-choking restraint. The hood includes a flange and a set of pivotal cleats for securing the lead to the hood thus maintaining the hood in place over the animal's head. Once hooded the animal is muzzled and thus rendered semi-harmless where upon the animals feet may be bound or neutralized by sedation. The handle can be used to hold the animal's head relatively steady while being maneuvered into cages or while being treated. Openings with removable covers are also provided in the hood to allow limited access to the animal's head, eyes and mouth. Embodiments are disclose, whereby the hood is slidable along a lead previously placed around the animal's neck or attached to the animal's collar, another embodiment utilizes the hood slidable along a special releasable capture stick with a minimum loop setting and a quick release for removing the stick from the lead and the hood thus leaving the hood over the animal's head retained in position by the lead.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 3 is a side elevation view of an embodiment with its capture stick being removed;

FIG. 4 is a side elevation view of an embodiment with hood extended along a lead encircling a dog's neck;

FIG. 5 is an isometric view of the releasable capture stick element of the embodiment;

FIG. 6 is a cross section view taken along sight line 6-6 seen in FIG. 5;

FIG. 7 is an enlarged isometric view of area 7 seen in FIG. 5;

FIG. 8 is an isometric view of the capture stick element seen in FIG. 5 in the lead release position;

FIG. 9 is a cross section view of the capture stick as shown in FIG. 8 taken along sight line 9-9;

FIG. 10 is an enlarged isometric view of area 10 seen in FIG. 8;

FIG. 11 is an enlarged isometric view of area 11 seen in FIG. 8;

FIG. 12 is a cross-section view of the adjustable buckle 42 seen in FIG. 5.

FIG. 13 is a cross-section view of the dual channel slide 34 seen in FIG. 5;

FIG. 14 is a cross-section view of the head covering 10 shown in FIG. 1;

FIG. 15 is a partial cross-section view of the pivotal chocking assembly;

5. DETAILED DESCRIPTION OF THE PREFERRED EMBODIMENT

Figure 1:
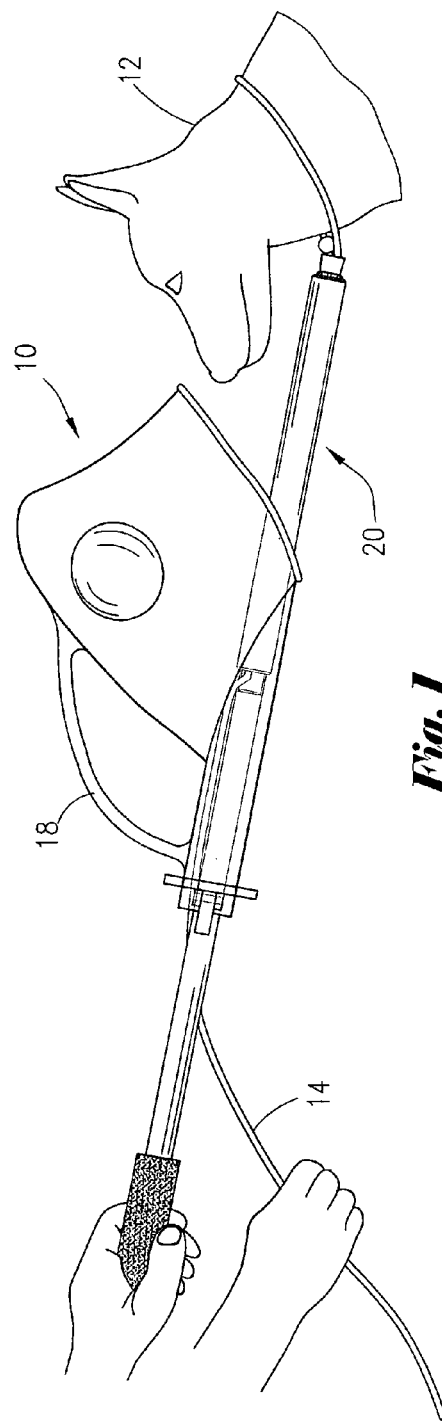
FIG. 1 is a side elevation view of an embodiment with hood retracted.
Figure 2:
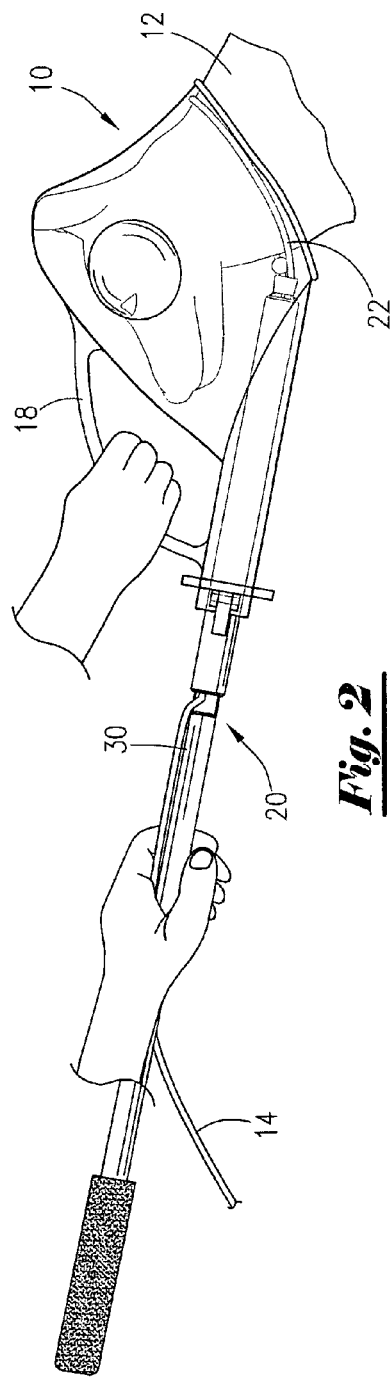
FIG. 2 is a side elevation view of an embodiment with hood extended.

As demonstrated in FIG. 1 and FIG. 2 the primary purpose of the enclosure or hood assembly 10 is to cover and enclose the animal's head and thereby effectively muzzle the animal. However, the animal must first be captured and thereby exert some degree of control over the animal. This can be done by simply attaching a leash to the animal's collar or utilizing a lead 14 having a loop encircling the animal's neck, the leash or lead 14 can then be passed through the tubular orifice 16 in the hood or enclosure 10. Extending the hood assembly 10 along the leash or lead 14 to fully enclose the animal's head 12 renders the animal relatively harmless. Attaching the lead 14 to the hood assembly 10 retains the hood or enclosure assembly 10 in position over the animal's head 12 as shown in FIG. 4. Having the handler stand in front of the animal tends to focus the animal's attention on the handler and the animal tends to back away thereby maintaining a taunt lead 14 thus reducing the possibility of choking the animal thereby reducing trauma. The handle 18 allows a handler to guide the enclosure or hood 10 over the animal's head 12 and further helps to control the animal once the hood is secured to the animal by the lead 14.

If the animal is not approachable and has no collar or leash a special releasable capture stick assembly 20 is used in conjunction with the hood assembly 10 in an embodiment demonstrated in FIG. 1. This embodiment utilizes a stick or pole with a lead forming a loop 22 at one end and a hood assembly 10 slidable along the length of the stick or pole assembly 20. The stick assembly 20 is used to place the loop 22 around the animal's neck and cinch the lead 14 down to a predetermined diameter of a sufficient size to insure restraint but not cause choking of the animal. The hood assembly 10 is extended forward towards the animal's head 12 to a position fully encircling the animal's head 12 as shown in FIG. 2. Rotation of the sleeve 30 allows the capture stick assembly 20 to be removed as shown in FIG. 3 thereby allowing the lead 14 to be retained by a pivotal chock assembly 44 attached to the hood assembly 10.

The capture stick assembly 20 as detailed in FIG. 5 includes a solid wood pole 26 with a handle grip portion 28 at one end and a rotatable sleeve member 30 extending from the opposite end to approximately mid length of the pole 26. As seen in FIG. 6, a portion of the pole 26 has a circular segment 29, seen in FIG. 8, having a secant slightly above the diametrical center of the pole 26. The sleeve 30 is also a circular segment extending its entire length with a secant slightly above its diametrical center, as well.

The thimble 38 is recessed into the pole 26 while the lead 14 is not recessed and is now exposed adjacent the thimble 38, as seen in FIG. 9.

The sleeve 30 is retained upon the pole by an upset 40 in the inner diameter of the sleeve cooperative within a groove in the pole 26, as shown in FIG. 10, so as to cover the circular segment 29 of the pole 26 when rotated to a closed position, as seen in FIG. 5 Thereby defining a cavity between the pole 26 and the sleeve 30, as seen in FIG. 6. A portion of the lead 14 is temporarily retained within the cavity between the pole and the sleeve, as seen in FIG. 7. Rotation of the sleeve 30, as shown in FIG. 8, exposes the lead 14 and its loop 32 thereby allowing the lead to be released from the pole 26. The loop 32 is formed by passing one end of the lead 14 through one channel of a parallel channel slide block 34, seen in FIG. 13, having a releasable counter-lock 36 and returned through an adjacent channel and retained by a thimble 38 attached to one end of the lead 14, as shown in FIG. 11. A recess is provided within the circular segment 29 of the pole adjacent the end opposite the handle 28 for placing the thimble and a portion of the lead 14, as shown in FIG. 11, so as to be retained by the sleeve 30 when rotated to the closed position, seen in FIG. 5. An adjustable sliding ball buckle 42, seen in FIG. 12, is used to limit the size of the loop 32 when the lead 14 is pulled taunt.

As the lead 14 passes though the muzzle or head enclosure 10 and its tubular orifice 16 the lead engages a gripping apparatus, preferably a pivotal chock assembly 44, with jaws 45 pivotal around pins 47 and biased towards each other that grip the lead 14, as detailed in FIG. 15 and thereby retaining the muzzle or head enclosure 10 in position relative to the lead 14. A an integral handle 18 as shown in FIG. 14 is used to guide the head enclosure along the capture pole assembly 20 and or the lead 14 when the pole is released from the lead 14, as seen in FIGS. 2,3,4.

Figure 16:
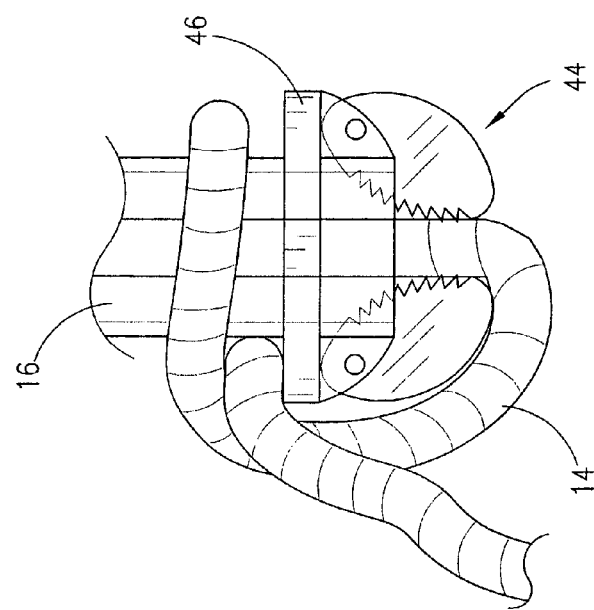
FIG. 16 is a partial top view of the head covering showing a means for further securing the lead to the covering.

A half hitch loop in the lead 14 can be located behind the flange 46, as seen in FIG. 16 either with or without the chock assembly 44 engaged thereby further securing the lead 14 to the head enclosure assembly 10, as seen in FIG. 16.

Any commercially available capture pole having a slip loop may be used with the animal head enclosure for temporary restraining the animal. Also any type of lead 14 may be used, such as a rope, cable, chain etc., in conjunction with the head enclosure assembly 10 with or without the buckle 42 or the slip block 34. All that is required is a lead 14 of some type having attachments for connecting the lead to an animal's collar or otherwise encircling the animal's head and passing one end of the lead 14 through the tubular orifice 16 for engagement with the chock assembly 44 and the other end attached to the animal. This arrangement is only possible if the animal is already restrained in some manner such as a leash or capture stick loop attached to the animal's neck.

Figure 17:
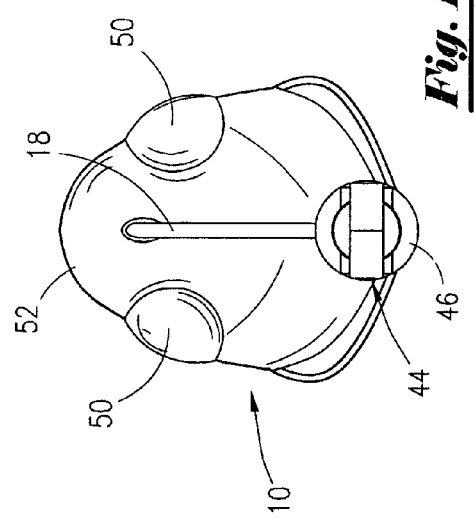
FIG. 17 is a front elevation view of the head covering.

As better seen in FIG. 17, the front view of the head enclosure 10 includes snap-in or screw on covers 50 secured to portals on each side of the enclosure or hood 52 or head enclosure 10 to allow access to the animal's head by medical technicians if necessary.

Figure 18:
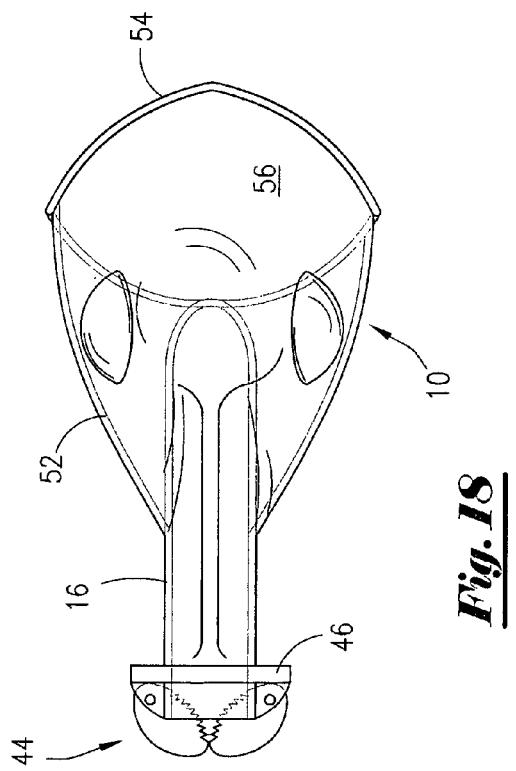
FIG. 18 is a bottom view of the head covering.

As further seen in FIG. 18, the tubular portion 16 is integral and smoothly transitions from the hood portion 52 so as to provide a strong structure that is less restrictive to the animal. It should also be noted that a translucent material is preferred rather than a transparent material so as to reduce light but still allow the animal to be observed. All edges of the head enclosure portion 52 should have smooth edges and a heavy bead 54 around the rather large head opening. The head enclosure may be described as a semi-transparent hollow enclosure having a geometrical trapezoidal profile with one side open and an integral tubular opening transitioning from internal to external located along a side adjacent to the open side. The shape is generally consistent with that of animals such as large dogs and the like.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:
1. An animal head enclosure and restraint assembly for temporally controlling fractious animals comprising:
  a) a semi-rigid enclosure, with an elliptical internal shape defining an animal head covering with at least one side open and a tubular portion extending from said enclosure opposite an open side;

b) an integral handle portion connecting said enclosure to said tubular portion;

c) a flange located adjacent one end of said tubular portion;

d) a pivotal lead gripping assembly attached adjacent to said flange;

e) a pole member having a circular segment portion having a secant slightly above the diametrical center of the pole extending along a portion of said pole starting at an end opposite said handle grip;

f) a recessed channel within said circular segment locate adjacent an end of said pole opposite said handle grip said recess conforming to said lead and a thimble attached to one end of said loop having a remaining free end;

g) a parallel channel slip block having a first and second channels said first channel slidable along said lead located adjacent said thimble with said free end of said loop slidably passing through said second channel thereby forming said adjustable slip loop;

h) an adjustable slide buckle attached to said lead adjacent said slip block; and j) a sleeve having a circular segment portion with a secant slightly above its diametrical center rotatable around circular segment portion of said pole, a portion of said lead slidable within said sleeve and temporally captured thereby.

\* \* \* \* \*